US012071780B2

(12) United States Patent
Baader et al.

(10) Patent No.: US 12,071,780 B2
(45) Date of Patent: Aug. 27, 2024

(54) METHOD FOR INTRODUCING PRESTRESSED ELEMENTS INTO A TOWER, ASSEMBLY DEVICE, UNWINDING DEVICE AND ADAPTER DEVICE

(71) Applicant: MAX BÖGL WIND AG, Sengenthal (DE)

(72) Inventors: Udo Baader, Georgensgmuend (DE); Udo Hiller, Parsberg (DE)

(73) Assignee: MAX GÖGL WIND AG, Sengenthal (DE)

( * ) Notice: Subject to any disclaimer, the term of this patent is extended or adjusted under 35 U.S.C. 154(b) by 952 days.

(21) Appl. No.: 16/978,382

(22) PCT Filed: Mar. 6, 2019

(86) PCT No.: PCT/EP2019/055539
§ 371 (c)(1),
(2) Date: Sep. 4, 2020

(87) PCT Pub. No.: WO2019/170728
PCT Pub. Date: Sep. 12, 2019

(65) Prior Publication Data
US 2021/0040762 A1    Feb. 11, 2021

(30) Foreign Application Priority Data
Mar. 7, 2018 (DE) ............ 10 2018 105 276.6

(51) Int. Cl.
*E04H 12/16* (2006.01)
*B66D 1/26* (2006.01)
(Continued)

(52) U.S. Cl.
CPC .......... *E04H 12/16* (2013.01); *B66D 1/26* (2013.01); *B66D 1/60* (2013.01); *E04G 21/12* (2013.01);
(Continued)

(58) Field of Classification Search
CPC .......... E04H 12/08; E04H 12/12; E04H 12/16; B66D 1/26; B66D 1/60; E04C 5/122; E04C 5/125; E04C 5/127
See application file for complete search history.

(56) References Cited

U.S. PATENT DOCUMENTS 1,537,942 A * 5/1925 Howard ............... B66D 1/36
                                                    242/157.1
2,922,599 A * 1/1960 Robert ............... B65H 54/2851
                                                    242/157.1
(Continued)

FOREIGN PATENT DOCUMENTS

CN        1659374 A      8/2005
CN        102939427 A    2/2013
(Continued)

OTHER PUBLICATIONS

German Patent Office Search Report for application No. 10 2018 105 276.6, dated Dec. 7, 2018 with English translation.
(Continued)

*Primary Examiner* — Adriana Figueroa
(74) *Attorney, Agent, or Firm* — JK Intellectual Property Law, PA

(57) ABSTRACT

Tensioning elements are introduced into a tower to a respective intended final position, in which each tensioning element to be pulled in is introduced into an interior space of the tower, connected to a pulling rope of a winch, and pulled into the tower in a direction from a bottom of the tower to a top of the tower by the winch. The method includes placing on an upper end of the tower, for example on an adapter piece and/or an anchoring ring, a mounting device with a boom rotatably mounted on a base frame; aligning the boom with respect to a mounting position of a given one of the tensioning elements; and pulling in and anchoring the given tensioning element to the upper end of the tower, wherein (Continued)

the pulling rope of the winch is guided above the mounting device. Related mounting, coiling, and adapter devices are also disclosed.

22 Claims, 3 Drawing Sheets

(51) Int. Cl.
- *B66D 1/60* (2006.01)
- *E04G 21/12* (2006.01)
- *E04C 5/12* (2006.01)
- *E04H 12/08* (2006.01)
- *E04H 12/12* (2006.01)
- *F03D 13/20* (2016.01)

(52) U.S. Cl.
CPC .............. *E04C 5/122* (2013.01); *E04H 12/08* (2013.01); *E04H 12/12* (2013.01); *F03D 13/20* (2016.05)

(56) References Cited

U.S. PATENT DOCUMENTS

| | | | | |
|---|---|---|---|---|
| 3,147,527 A * | 9/1964 | Gilmore | .................... | F16C 1/10 403/368 |
| 3,150,861 A * | 9/1964 | Ahlbin | .................... | B66D 1/36 242/397.2 |
| 3,371,885 A * | 3/1968 | Douglas | .................. | B28B 21/64 242/129 |
| 4,123,040 A * | 10/1978 | Kuzarov | ................... | B66D 1/28 254/389 |
| 4,494,890 A * | 1/1985 | Lusk | ....................... | H01B 17/38 403/368 |
| 4,932,185 A * | 6/1990 | Lebel | .................... | E04G 21/328 52/37 |
| 5,005,229 A | 4/1991 | Bertoni | | |
| 5,415,490 A * | 5/1995 | Flory | .................... | F16G 11/042 403/267 |
| 6,910,679 B1 * | 6/2005 | Vogt | ....................... | E21B 19/008 242/157.1 |
| 7,451,527 B2 * | 11/2008 | Pearce | .................... | F16G 11/05 24/136 L |
| 8,052,396 B2 | 11/2011 | Wobben | | |
| 9,091,095 B2 | 7/2015 | Bögl et al. | | |
| 9,375,861 B2 * | 6/2016 | Schibsbye | ............... | E04G 11/20 |
| 9,677,275 B2 * | 6/2017 | Stracke | .................. | E02D 27/425 |
| 10,006,203 B2 * | 6/2018 | Cordero | ................... | B66C 11/06 |
| 10,415,261 B2 * | 9/2019 | Allen | .................... | E04G 21/328 |
| 10,443,205 B2 | 10/2019 | Menzel | | |
| 10,538,936 B2 | 1/2020 | Knitl et al. | | |
| 10,731,727 B2 * | 8/2020 | Eicher | ................... | F16G 11/042 |
| 10,954,686 B2 * | 3/2021 | Chase | ..................... | E04H 12/16 |
| 11,021,887 B2 * | 6/2021 | Keller | ................... | E04H 12/341 |
| 2014/0124719 A1 * | 5/2014 | Wiley | ...................... | B66D 1/34 254/342 |
| 2015/0292263 A1 | 10/2015 | Hierl | | |
| 2016/0237985 A1 | 8/2016 | Bögl et al. | | |
| 2017/0183872 A1 | 6/2017 | Cordero et al. | | |

FOREIGN PATENT DOCUMENTS

| | | | | |
|---|---|---|---|---|
| CN | 103950100 | A | 7/2014 | |
| CN | 106121346 | A | 11/2016 | |
| DE | 38 44 895 | C2 | 2/2000 | |
| DE | 101 61 426 | A1 | 6/2003 | |
| DE | 102014218073 | A1 * | 3/2016 | ........... B65H 49/305 |
| DE | 102017204566 | A1 * | 9/2018 | |
| EP | 2 851 328 | | 3/2015 | |
| EP | 2851328 | A1 * | 3/2015 | ............ B66C 23/06 |
| WO | WO 2006/070430 | A1 | 7/2006 | |
| WO | WO 2019/076786 | A1 | 4/2016 | |
| WO | WO 2017/039975 | A1 | 3/2017 | |
| WO | WO 2019/025505 | A1 | 2/2019 | |

OTHER PUBLICATIONS

International Search Report for application No. PCT/EP2019/055539, dated Jul. 9, 2019 with English translation.
Booklet "Seonghwa Support", dated Aug. 2014.
Chinese Examination Report, dated Jul. 19, 2021, with English translation.

* cited by examiner

METHOD FOR INTRODUCING PRESTRESSED ELEMENTS INTO A TOWER, ASSEMBLY DEVICE, UNWINDING DEVICE AND ADAPTER DEVICE

CROSS-REFERENCE TO RELATED APPLICATIONS

This application is a national stage of International Application No. PCT/EP2019/055539, filed Mar. 6, 2019, and claims benefit to German Patent Application No. 10 2018 105 276.6, filed Mar. 7, 2018, both of which are incorporated by reference herein.

TECHNICAL FIELD

The present disclosure refers to a method for introducing tensioning elements into a tower, in each case in their intended final position, in which a tensioning element is in each case currently introduced into an interior space of the tower, connected to a pulling rope of a winch and pulled into the tower from the bottom to the top by means of the winch.

Moreover, the disclosure refers to a mounting device for introducing tensioning elements into a tower with a base frame to attach the mounting device to the tower, an uncoiling device for introducing tensioning elements into a tower with a base mount, a drum rotatably mounted on the base mount and an adapter device for introducing a tensioning element into a tower, wherein the adapter device has a lifting eye for connecting the adapter device to a pulling rope and a connecting body for connecting the adapter device to the tensioning element.

SUMMARY

Sometimes, very high towers are especially needed for wind turbines and therefore they must be very stable. The best results have been achieved with so-called hybrid towers that have a lower section made of concrete, which most of the time consists of prefabricated concrete parts, on which a tower top made of steel is placed in a subsequent step. In order to ensure the needed stability in the concrete tower and distribute the load of the steel top, the entire length of the concrete parts is tensed with tensioning elements. During the installation, the tensioning elements—which consist mostly of steel ropes—must be brought all the way to the upper end of the concrete tower, where they are fastened to an adapter piece that connects the concrete tower and steel top.

To achieve this, the tensioning elements used to be hoisted to the adapter piece in a coiled state with a crane and introduced into the tower from the top to the bottom, a technique known from DE 10 2014 218 073 A1, for example, but its disadvantage is the significant time and effort required for this and the likewise very expensive and necessary use of the crane. It is especially during standstill periods caused by weather conditions when the obligatory crane involves enormous expenses.

A crane-free method that uses an adapter piece with already poured-in anchor rods is suggested by WO 2017/039975 A. A guide pulley, above which a pulling rope is guided, moved by a rope winch in the lower section of the tower and in each case pulled in to the tower by one tensioning element from the bottom to the top, is fastened to the anchor rods. One tensioning element is attached to several anchor rods by one anchor plate. The disadvantage of this method are the absolutely necessary anchor rods and a time-consuming assembly/disassembly of the guide pulley for each individual tensioning element. All methods used so far have in common a delivery of the tensioning elements in a coiled state on a coiling body or drum for the installation. After the tensioning element is installed, the drum must be transported away too, which involves logistical expenditure and effort.

Therefore, the present disclosure has the task of suggesting a method and the corresponding devices to allow a simplified installation of the tensioning elements from the bottom without a coiling body.

The task is solved by a method, a mounting device, an uncoiling device and an adapter device having the characteristics of the following disclosure and claims.

The method according to the disclosure describes the preferably crane-free introduction of tensioning elements into a tower, in each case to their intended final position. Here, a tensioning element currently to be introduced into an interior space of the tower is connected to a pulling rope of a winch and pulled in to the tower from the bottom to the top by means of the winch.

To accomplish this, it is suggested to place a mounting device with a boom rotatably mounted on a base frame on an adapter piece of the tower, especially on an anchoring ring. Afterwards, the boom is aligned with regard to a mounting position of the tensioning element currently to be pulled in and the tensioning element is pulled in and anchored to the anchoring ring. When doing so, the pulling rope of the winch is guided above the mounting device.

No obligatory anchoring rods are necessary on the adapter device to implement the described method. The mounting device is preferably set up exactly once. To pull in the individual tensioning elements, merely the rotatably mounted boom is aligned accordingly, thereby making the method according to the disclosure time efficient and flexible.

Apart from installing the tensioning elements, the mounting device with pulling rope and winch can also be used, for example, to transport the workers and/or other material to the upper section of the tower.

It is particularly advantageous if, after anchoring a first tensioning element, the boom of the mounting device is turned to the mounting position of the next tensioning element, the pulling rope of the winch is returned and the next tensioning element is connected to the pulling rope and pulled in by means of the winch. This could already be taking place for a fast workflow while work on the first tensioning element is being completed, like the anchoring to the lower section the tower, for example.

It is additionally advantageous if the winch is arranged in the interior space of the tower, especially in the tower base or on a tower foundation, and the pulling rope of the winch is guided downwards once again above at least one redirection of the mounting device. This allows the use of preferably high-performance winches that owing to their weight should be brought only with a great deal of effort to the anchoring section of the tower. In addition, this especially allows an anchoring to the tower base section/tower foundation. A corresponding winch can weigh, for example, about 700 kg and reach a hoisting speed of the tensioning elements of approx. 15 m/min. However, an alternate arrangement of the winch in the upper section of the tower on the mounting device, for example, is conceivable as well.

Preferably, the pulling rope is guided above two guide pulleys of the mounting device. It is conceivable that at least one additional guide pulley is arranged on the inner wall of the tower so the pulling rope can be flexibly guided inside the tower, depending on the space available.

Another advantageous execution consists of providing a redirection in the tower base area that can be used for the advance positioning of the tensioning element under the subsequent anchoring position.

It is additionally advantageous for the method if the pulling rope is guided through a cladding tube of the adapter piece and/or the tower in the mounting position of the tensioning element and only then connected to the tensioning element. This allows the tensioning element to be guided through the cladding tube without additional effort. Such guiding through is necessary, for example, when the tensioning elements are anchored to the upper side of the adapter piece or tower. In particular, the tensioning elements can thus be easily fixed in place from the top with retaining nuts.

In another advantageous execution, the pulling rope is guided with the side of the tensioning element to be anchored through a finally placed anchoring element, which can be a retaining nut.

It is furthermore advantageous if the pulling rope of the winch is connected to an anchor, especially a fixed anchor, of the tensioning element by means of an adapter device. When anchoring tensioning elements, a distinction is made between fixed and stressing anchors, wherein the stress of the tensioning element is exerted on the stressing anchor, mostly by hydraulic presses, at the end of the installation. At least one anchor intended for the anchoring of the tensioning element in the top section of the tower is advantageously assembled on the tower, preferably on its top, at a time before the tensioning element is pulled in.

It is very advantageous for the method according to the disclosure if the pulling rope of the winch is connected to this anchor by means of an adapter device. As a result of this, the contact point for the pulling rope does not have to be an integral part of the tensioning element or its anchor and ideally, the method according to the disclosure does not have to be adapted when the tensioning elements are manufactured. A conceivable alternative would be a direct connection of the adapter device to the tensioning element in case the anchoring device is added only afterwards.

The adapter device could be connected to the anchor with preferably four screws, for example. In addition, the pulling rope could be connected to the adapter device by means of a crane hook.

To improve the rope guidance, the adapter device has preferably a ballast.

The adapter device and its connection to the anchor could be designed in a way to allow a passing through the cladding tube and anchoring elements without an adaptation. To achieve this, the diameter of the adapter device should preferably not be greater than the diameter of the tensioning element.

In an advantageous embodiment of the method, the tensioning elements are delivered to the construction site bodiless and coiled and loaded into an uncoiling device with a rotatable receiving plate, thereby avoiding the logistical effort owing to the transport and re-transport of a coil body. The tensioning elements are kept in their coiled state preferably with straps and hoisted in this way to the uncoiling device. The tensioning elements can be loaded into the uncoiling device with the help of a forklift, for example. After the hoisting, the straps are successively removed from the uncoiling device, whereby the tensioning elements expand in the uncoiling device and abut the side wall of the receiving plate. The turning of the receiving plate of the uncoiling device prevents friction forces from occurring in the uncoiling device due to the tensioning elements getting jammed therein. Preferably, the tensioning elements are uncoiled horizontally, although the rotation axis of the receiving plate lies perpendicularly to the ground. Alternatively, an upright uncoiling of the tensioning elements is naturally conceivable as well.

Furthermore advantageous is an introduction of the tensioning elements into a lower section of the tower through an opening. The access opening that is typically intended for maintenance work after completion of the tower can be used for this, for example, so no additional opening has to be provided in the tower.

Advantageously, a subsequent tensioning element is already pulled from the uncoiling device to the interior space of the tower by means of an additional winch already while the current tensioning element is being pulled in and/or while the pulling rope is being returned.

An additional winch, possibly smaller and thus more mobile, could be used because the tensioning element does not have to be hoisted by this winch and thus a lower performance is also sufficient. This embodiment of the method allows a faster working speed and therefore time-saving installation of the tensioning elements. The additional winch could also be used, for example, to transport workers and/or materials to the upper section of the tower.

It is especially advantageous if the mounting device is pre-assembled on an adapter piece of the tower and hoisted to the tower together with the adapter piece. Since the adapter piece must be hoisted to the tower with a crane, this means no additional effort to bring the mounting device to the tower together with the adapter piece. Naturally, the mounting device could be assembled on the tower afterwards. For example, only one base frame of the mounting device could be pre-assembled on the adapter piece and the remainder added only later.

In the mounting device according to the disclosure for the preferably crane-free introduction of tensioning elements into a tower with a base frame for fastening the mounting device to the tower, it is suggested to arrange a preferably freely 360° rotatable boom in the base frame, preferably centered in it.

At least one redirection component, such as a guide pulley, is preferably arranged on the mounting device. In particular, two redirection components, which can be guide pulleys, are arranged on the mounting device to allow the positioning of the pulling rope both for pulling the tensioning element and for alignment on the winch.

The base frame could be attached to the tower, for example, by screws, welding, reinforcing with concrete, riveting, wedging, introducing, gluing or similar suitable measures. Just as conceivable is an attachment accomplished by a tight fit or friction, since the forces during hoisting have a favorable effect on overall stability. In addition, it is advantageous if the base frame is attached to the tower in at least three and especially four places to provide the mounting device with the needed stability.

To move and especially rotate the boom better around the base frame, the boom could be provided with at least one wheel and especially two wheels, for example.

The mounting device allows, for example, to arrange a winch in the lower section of the tower, especially on its foundation, to pull the pulling rope guided by the mounting device and particularly a tensioning element associated with it to an upper section of the tower. However, a conceivable alternative would also be to arrange the winch in the upper section of the tower and especially on the mounting device.

In particular, the boom of the mounting device allows the pulling rope to be guided from the top through a cladding tube that penetrates the adapter piece and/or the tower and thus to pull the tensioning element from the bottom to the top through the cladding tube.

The rotatable mounting of the boom allows a repositioning for each tensioning element without time-consuming de-installation of the mounting device.

It is furthermore advantageous if the mounting device can be disassembled for set up, dismantling, hoisting and transportation purposes and especially if the base frame can be disassembled from the boom. As a result of this, the mounting device can be economically transported and also be brought onto the tower without a crane. It would be especially conceivable to mount the base frame on the adapter piece before the adapter piece is hoisted to the tower and later mount the boom.

It is additionally advantageous if the mounting device is made of aluminum to keep the weight of the mounting device low but with high load-bearing capacity at the same time. A low weight means less effort during transportation, building and dismantling. It's self-evident that commercially available individual parts and connecting pieces such as screws, nuts and rivets made from other materials can be used when the mounting device is being assembled.

Moreover, an uncoiling device for the preferably crane-free introduction of tensioning elements into a tower with a base frame and a drum rotatably mounted on the base frame is suggested, characterized by the fact that the drum has a receiving plate to receive an especially bodiless coiled tensioning element.

With tensioning elements that are delivered to the site with winding reel or drum, the latter is placed in an uncoiling device so it can rotate. The uncoiling then takes place by turning the winding reel. With bodiless coiled tensioning elements, the rotatably mounted drum must be a part of the uncoiling device. In addition, the drum must have a receiving plate on which the coiled tensioning element can be placed down.

The uncoiling of the tensioning element by turning the drum makes it possible to loosen the clamping of the tensioning element in the uncoiling device with minimum use of force. However, the suggested uncoiling device is also suitable for uncoiling tensioning elements that are coiled on a winding reel.

To ensure the stability of the uncoiling device, the base mount could be anchored to the tower foundation, for example. Preferably, the uncoiling device is mostly made of a sturdy material such as steel or aluminum. The receiving plate can be formed by a continuous disk or individual struts, for example. The diameter of the receiving plate is preferably larger than the diameter of a coiled tensioning element.

It is especially advantageous for the uncoiling device if the drum includes a side wall attached to the receiving plate in a rotationally fixed manner to protect workers from movements of the tensioning element caused by the tension. In addition, the tensioning element is kept securely on the receiving plate by the side wall. To introduce the tensioning element, the side wall could have an especially closeable opening. Preferably, the height of the side wall corresponds at least to the thickness of a coiled tensioning element.

It is very advantageous for setting up, dismantling and transporting the uncoiling device if the drum can be disassembled into at least two parts. It would also be advantageous if the base mount can be detached from the drum and/or can also be disassembled. Thus, the otherwise possibly bulky uncoiling device can be transported with little effort.

It is furthermore advantageous if the uncoiling device includes a tensioning element guide wherein preferably the tensioning element guide is firmly arranged on the base mount. A corresponding guide increases worker safety and prevents possible damage to the tensioning elements and the tower when the tensioning elements are pulled in.

The tensioning element guide could, for example, include at least one reel to improve the sliding of the tensioning element in the tensioning element guide, In addition, the tensioning element guide could be movably mounted to compensate for tensions that could be produced when the tensioning elements are installed in different positions with the unchanged position of the uncoiling device. Preferably, the tensioning element guide is located above the drum in front of the uncoiling device.

According to an advantageous arrangement of the uncoiling device, the drum is arranged on the base frame in a horizontal orientation. Here, the rotation axis of the drum is preferably aligned perpendicularly to the ground. In this way, the tensioning element is kept in the drum by its own weight and a uniform uncoiling of the tensioning element is ensured.

Furthermore, an adapter device for the preferably crane-free introduction of a tensioning element into a tower is suggested, wherein the adapter device has a lifting eye to connect the adapter device to a pulling rope and a connecting body so the adapter device can be connected to the tensioning element. The suggested adapter device is characterized by the fact that the connecting body is preferably executed as round connecting plate and intended to be connected, especially to be screwed together, to an anchor of the tensioning element. Such an adapter device allows the tensioning element or its anchor to be pulled in into the tower without an own contact point for a hook. Apart from screwing together the connecting body and anchor, welding could also be conceivable.

Advantageously, the connecting body has preferably four through-holes that can serve for screwing together the connecting body and the anchor of the tensioning element. It would be conceivable to provide the through-holes with a weight.

It is additionally advantageous for the diameter of the connecting body to be smaller than the diameter of the tensioning element anchor. The cladding tubes through which the anchor and tensioning element will possibly have to be guided are generally adapted to the diameter of the anchor and tensioning element. If the diameter of the connecting body is smaller than the diameter of the tensioning element anchor, no additional precautionary measures have to be taken here. To ensure sufficient stability, the diameter of the connecting body should be especially slightly smaller than the diameter of the anchor. Advantageously, the radial extensions of the lifting eye should not be larger than those of the connecting body.

BRIEF DESCRIPTION OF THE DRAWINGS

Additional advantages of the disclosure are described in the following embodiments, which show.

DETAILED DESCRIPTION

In the following description of the figures, the same reference signs are used for identical and/or at least similar features. Most of the time, the individual features and their arrangement and/or mode of action are explained in detail only when they are mentioned for the first time. If individual features are not explained in detail again, then their arrangement and/or mode of action correspond to the mode of action of the arrangement and mode of action of the features having the same mode of action or name already described.

Figure 1:
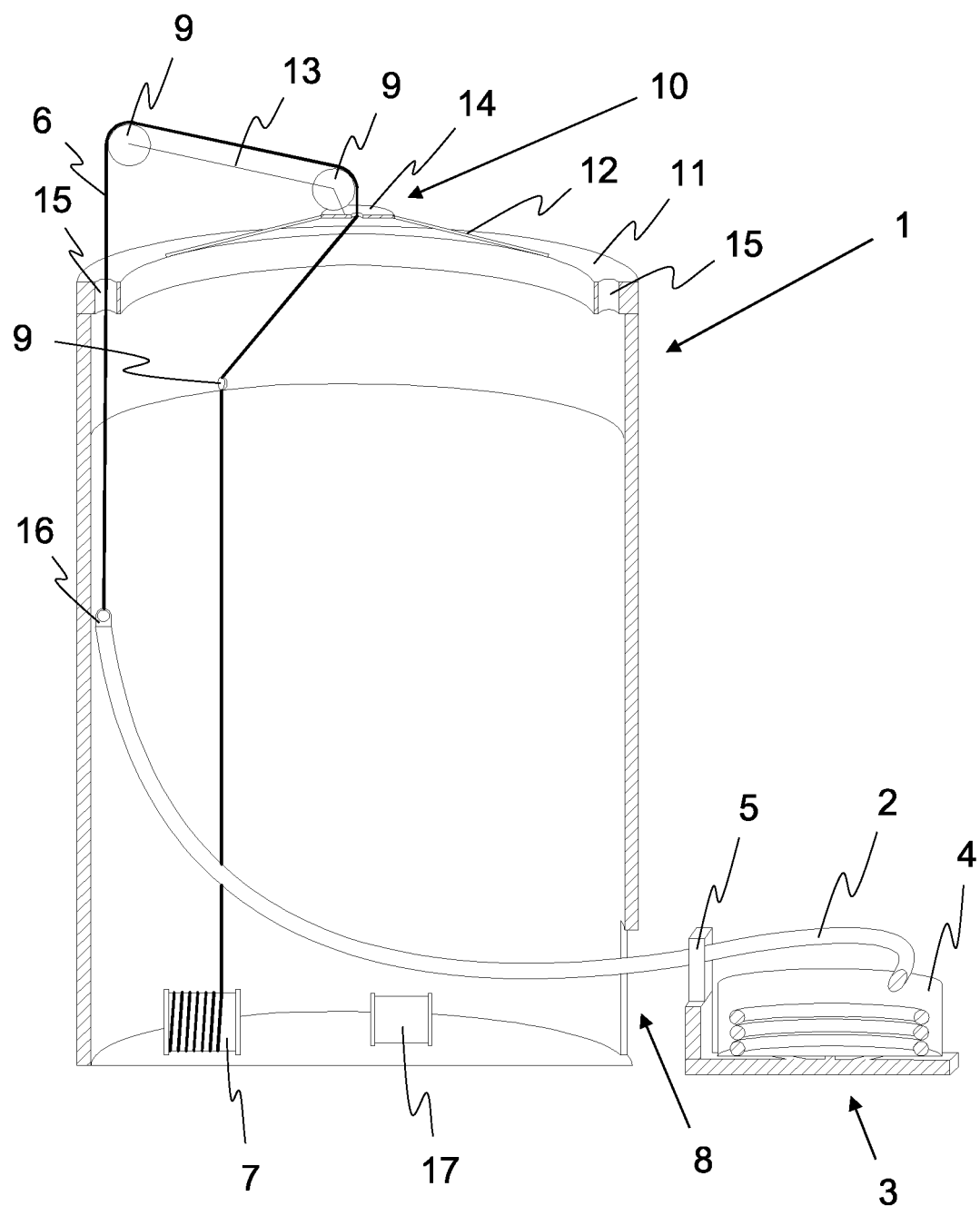
FIG. 1 is a cross-sectional view through a tower being built.

FIG. 1 shows a tower 1 being built, into which a tensioning element 2 is being pulled applying a method according to the disclosure. The tensioning element 2 is uncoiled by an uncoiling device 3 with a drum 4 and a tensioning element guide 5. The tensioning element 2 is pulled through an opening 8 to the upper section of the interior space of the tower 1 by a pulling rope 6 driven by a winch 7 in the lower section of the tower 1. The pulling rope 6 is guided through several guide pulleys 9. When doing so, at least one guide pulley 9 can be arranged on the inner wall of the tower 1, for example. Two guide pulleys 9 are arranged on a mounting device 10 fastened to an adapter piece 11 on the tower 1. The mounting device 10 consists of a base frame 12 and a boom 13. In order to ensure a rotatable mounting of the boom 13 on the base frame 12, both could be joined with a hinge 14. On the adapter piece 11, the pulling rope 6 is guided through the cladding tube 15. The pulling rope 6 and tensioning element 2 are connected to one another via an adapter device 16. In the method described here, the tensioning element 2 runs mostly inside the interior space of the tower 1 after the installation. It is alternately conceivable for the tensioning elements 2 to also run fully or partially in the hollow spaces intended for this in the jacket of the tower 1. The rotatable mounting of the boom 13 of the mounting device 10 allows the latter to be repositioned without a laborious reconstruction depending on the mounting position of the tensioning element 2 currently to be pulled in.

An optional additional winch 17 can be used, for example, to pull in a tensioning element 2 into the interior space of the tower 1. With this additional winch 17, workers and/or materials could also be brought to the upper section of the tower 1. The described method makes it possible to install the tensioning element 2 without a crane. The mounting device 10 can be used to install all tensioning elements 2 of the tower 1 without a laborious reconstruction by bringing the boom 13 to the respective mounting position by turning the hinge 14.

Figure 2:
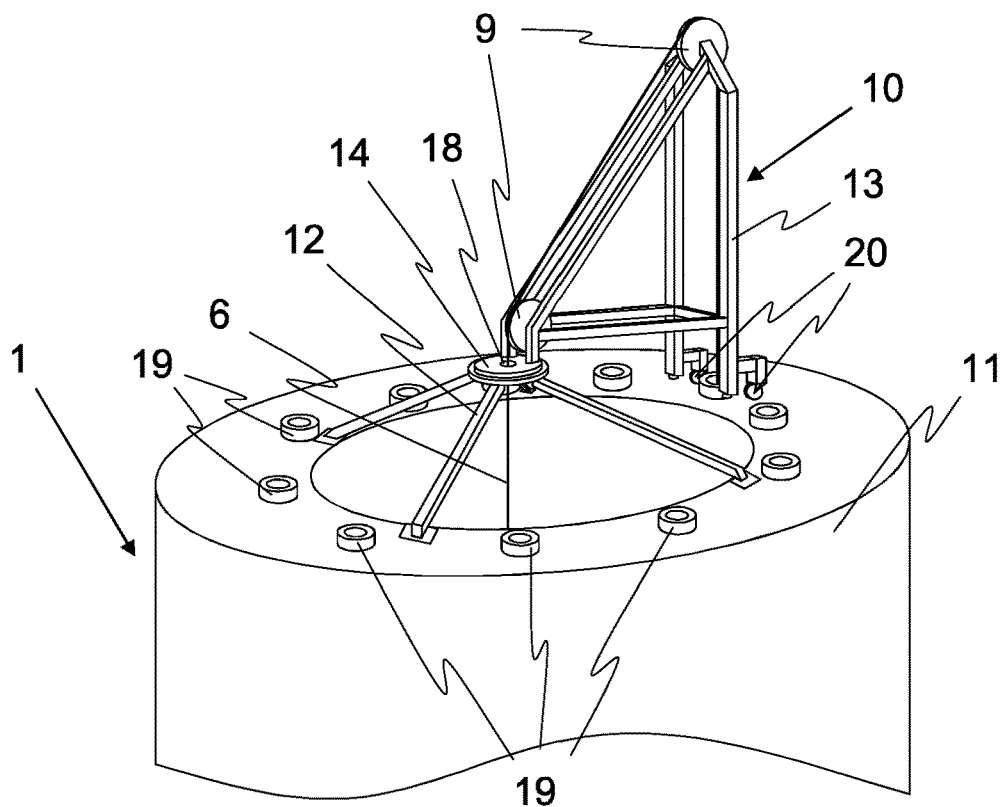
FIG. 2 is an isometric view of a mounting device according to the disclosure on an adapter piece of a tower, including a guided pulling rope.

FIG. 2 shows a detailed view of a mounting device 10 according to the disclosure. The mounting device 10 is installed on the adapter piece 11 of a tower 1 with a base frame 12. With the base frame 12, a boom 13 is rotatably connected through a hinge 14. From the interior space of the tower 1, a pulling rope 6 is guided in the adapter piece 11 through guide pulleys 9 along the mounting device 10 through a cladding tube 15 (not shown). The pulling rope 6 penetrates the hinge 14 of the mounting device 10 through a centrally arranged recess 18, for example.

Anchoring elements 19, such as retaining nuts, are arranged on the upper side of the adapter piece 11 above the respective cladding tubes 15. They constitute one of the possibilities to fix the tensioning elements 2 (not shown) in place on the adapter piece 11. An easy movability of the boom 13 with respect to the adapter piece 11 is ensured with two wheels 20, for example.

Figure 3:
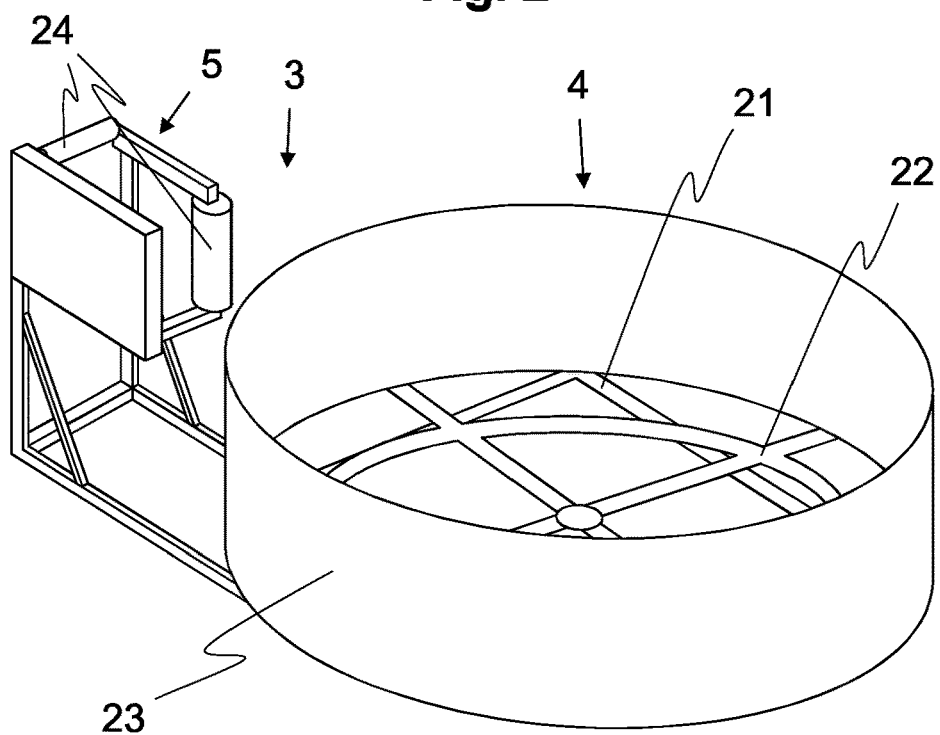
FIG. 3 is an isometric view of an uncoiling device according to the disclosure.

FIG. 3 shows an uncoiling device 3 according to the disclosure consisting of a base mount 21, a drum 4 and a tensioning element guide 5. A receiving plate 22 inside the drum 4 serves to receive a bodiless coiled tensioning element 2 (not shown).

The horizontal orientation of the drum 4 allows the tensioning element 2 to remain in the uncoiling device 3 due to its own weight. With respect to the receiving plate 22, the drum 4 is rotatably mounted. A side wall 23 arranged on the drum 4 serves to protect workers and stabilize the tensioning element 2. The tensioning element guide 5 can have reels 24, for example two reels 24, to improve the sliding of the tensioning element 2.

Figure 4:
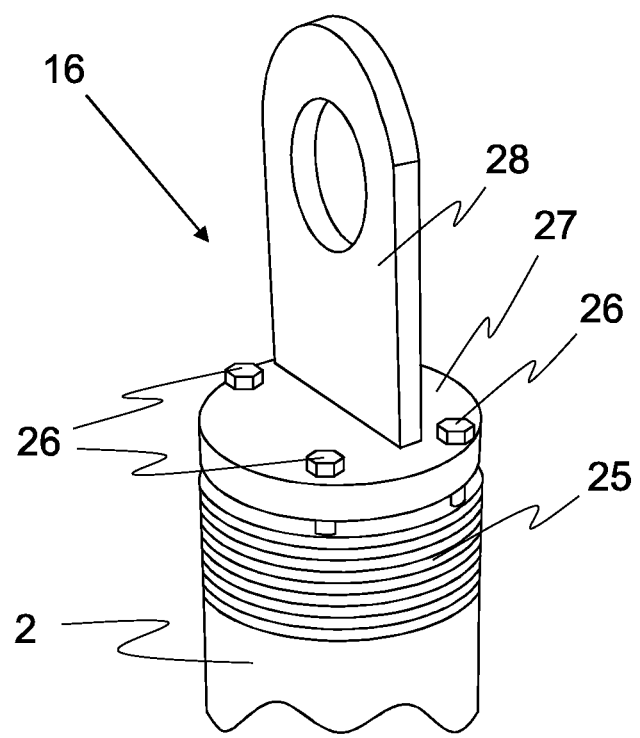
FIG. 4 is an isometric view of an adapter device according to the disclosure fastened to an anchor of a tensioning element.

FIG. 4 shows an adapter device 16 according to the disclosure fastened to an anchor 25 of a tensioning element 2. The fastening is accomplished, for example, with especially four screws 26, three of which are seen in the diagram. The screws 26 penetrate a connecting body, in particular a round connecting plate 27, through through-holes not visible in the diagram. Various screw head profiles, like a hexagonal profile, are conceivable.

The screws 26 reach into the corresponding threaded holes in the anchor 25 of the tensioning element 2. The connection between adapter device 16 and tensioning element 2 executed in this way has a high tensile strength.

The anchor 25 is preferably provided with an external weight that will serve for the subsequent fastening by an anchoring element 19, which can be a retaining nut. The hook of a pulling rope 6 can be mounted on a lifting eye 28 of the adapter device 16.

The lifting eye 28 and the connecting body are welded together, for example, but other types of connections, such as screwing or riveting, are also possible. Preferably, the radial extension of the adapter device 16, especially the diameter of the connecting body, is smaller than the diameter of the tensioning element 2 or its anchor 25.

The present disclosure is not restricted to the embodiments shown and described. Variations within the framework of the patent claims are just as possible as a combination of the features, even if they are shown and described in different embodiments.

LIST OF REFERENCE SIGNS

1 Tower
2 Tensioning element
3 Uncoiling device
4 Drum
5 Tensioning element guide
6 Pulling rope
7 Winch
8 Opening
9 Guide pulley
10 Mounting device
11 Anchoring ring
12 Base frame
13 Boom
14 Hinge
15 Cladding tube
16 Adapter device
17 Additional winch
18 Recess
19 Anchoring element
20 Wheel 21 Base mount
22 Receiving plate
23 Side wall
24 Reel
25 Anchor
26 Screw
27 Connecting plate
28 Lifting eye

The invention claimed is:

1. A method for introducing tensioning elements into a tower to a respective intended final position in which at least a given one of the tensioning elements is introduced into an interior space of the tower, connected to a pulling rope of a winch, and pulled into the tower in a direction from a bottom of the tower to a top of the tower by the winch, the method comprising the steps of:
 placing on an upper end of the tower a mounting device with a boom rotatably mounted on a base frame;
 aligning the boom with respect to a mounting position of the given tensioning element; and
 pulling in and anchoring the given tensioning element to the upper end of the tower, wherein the pulling rope of the winch is guided above the mounting device.

2. The method according to claim 1, wherein after anchoring the given tensioning element, the boom of the mounting device is rotated to a mounting position of a next one of the tensioning elements, the pulling rope of the winch is returned and the next tensioning element is connected to the pulling rope of the winch and pulled in with the winch.

3. The method according to claim 1, wherein the winch is arranged in the interior space of the tower and the pulling rope of the winch is guided once again downwards above at least one redirection of the mounting device.

4. The method according to claim 1, wherein the pulling rope is guided through a cladding tube of at least one of an adapter piece, an anchoring ring, and the tower arranged in the mounting position of the tensioning element and only then connected to the given tensioning element.

5. The method according to claim 4, wherein the pulling rope is guided through an anchoring element of at least one of the given tensioning element and the tower arranged in the mounting position of the given tensioning element and only then connected to the given tensioning element.

6. The method according to claim 1, wherein the pulling rope of the winch is connected to an anchor of the given tensioning element with an adapter device.

7. The method according to claim 1, wherein the tensioning elements are delivered in a bodiless coiled state to a construction site of the tower and loaded into an uncoiling device with a rotatable receiving plate.

8. The method according to claim 1, wherein the tensioning elements are introduced into a lower section of the tower through an opening.

9. The method according to claim 1, wherein the tensioning elements are redirected in a lower section of the tower with an additional redirection.

10. The method according to claim 7, wherein at least one of: a) while the given tensioning element is being currently pulled in, and b) while the pulling rope is being returned, a next one of the tensioning elements is pulled from the uncoiling device to the interior space of the tower with an additional winch.

11. The method according to claim 4, wherein the mounting device is pre-assembled on the adapter piece of the tower and hoisted to the tower together with the adapter piece, the adapter piece including the anchoring ring.

12. A mounting device for introducing tensioning elements into a tower, the mounting device comprising:
 a base frame configured for attachment to the tower;
 a boom mounted on the base frame via a hinge, the boom being rotatable relative to the base frame around the hinge; and
 at least one wheel rotatably attached to the boom, the at least one wheel rolling along an upper surface of the tower and at least partially supporting the boom when the boom rotates around the hinge.

13. The mounting device according to claim 12, wherein the mounting device can be disassembled for set up, dismantling and hoisting purposes, and the base frame can be separated from the boom.

14. The mounting device according to claim 12, wherein the mounting device is made of aluminum.

15. An uncoiling device for introducing tensioning elements into a tower, the uncoiling device comprising:
 a base mount;
 a drum rotatably mounted on the base mount, wherein the drum has a receiving plate to receive a coiled tensioning element within the drum; and
 a tensioning element guide attached to the base mount, the tensioning element guide including at least one reel to improve the sliding of a tensioning element when being introduced into a tower.

16. The uncoiling device according to claim 15, wherein the drum includes a side wall connected to the receiving plate in a torque-proof way.

17. The uncoiling device according to claim 15, wherein the drum can be disassembled into at least two parts.

18. The uncoiling device according to claim 15, wherein the drum is arranged on the base mount in a horizontal orientation.

19. An adapter device for introducing into a tower a tensioning element having an anchor defining a diameter, the adapter device comprising:
 a lifting eye configured for connection to a pulling rope; and
 a connecting body configured for connection to the tensioning element, wherein the connecting body includes a connecting plate with an upper surface, wherein the lifting eye is welded to the connecting body so that the lifting eye extends perpendicular to the upper surface, and wherein the connecting body is configured for connection to an anchor of the tensioning element, and wherein the connecting body is round and has a diameter less than the diameter of the anchor.

20. The adapter device according to claim 19, wherein the connecting body defines several through-holes.

21. The adapter device according to claim 19, wherein a diameter of the connecting body is smaller than a cladding tube of at least one of an adapter piece, an anchoring ring, and the tower.

22. The mounting device according to claim 12, wherein the boom is mounted on the base frame so as to be centered in the base frame and freely rotatable by 360° via the hinge.

* * * * *

UNITED STATES PATENT AND TRADEMARK OFFICE
CERTIFICATE OF CORRECTION

| | | |
|---|---|---|
| PATENT NO. | : 12,071,780 B2 | Page 1 of 1 |
| APPLICATION NO. | : 16/978382 | |
| DATED | : August 27, 2024 | |
| INVENTOR(S) | : Udo Baader and Udo Hiller | |

It is certified that error appears in the above-identified patent and that said Letters Patent is hereby corrected as shown below:

On the Title Page

Line 9, Item (73) currently reads "MAX GÖGLE WIND AG" and should be corrected to read MAX BÖGLE WIND AG Signed and Sealed this
Fourteenth Day of January, 2025

Derrick Brent
*Acting Director of the United States Patent and Trademark Office*